United States Patent [19]

O'Neill et al.

[11] 4,021,622
[45] May 3, 1977

[54] NONLOCKING KEY TELEPHONE SET

[75] Inventors: John Francis O'Neill, Boulder, Colo.; Howard Robert Popper, Berkeley Heights, N.J.

[73] Assignee: Bell Telephone Laboratories, Incorporated, Murray Hill, N.J.

[22] Filed: Dec. 5, 1975

[21] Appl. No.: 637,883

[52] U.S. Cl. .............................. 179/99; 179/84 L
[51] Int. Cl.² .......................................... H04M 1/72
[58] Field of Search ........................... 179/84 L, 99

[56] References Cited
UNITED STATES PATENTS

R26,722  11/1969  Limiero et al. ...................... 179/99

Primary Examiner—Kathleen H. Claffy
Assistant Examiner—Randall P. Myers
Attorney, Agent, or Firm—Rosemary A. Ryan; Charles Scott Phelan

[57] ABSTRACT

A nonlocking key telephone station is arranged to display full line status information when the station is on-hook and for normally illuminating only the key lamp associated with the line in use at the station when the set is off-hook. To permit a user to discern the full status of the lines terminating at the set when the set is off-hook, circuitry responsive to the depression of one of the keys at the station is provided for displaying full line status information.

8 Claims, 1 Drawing Figure

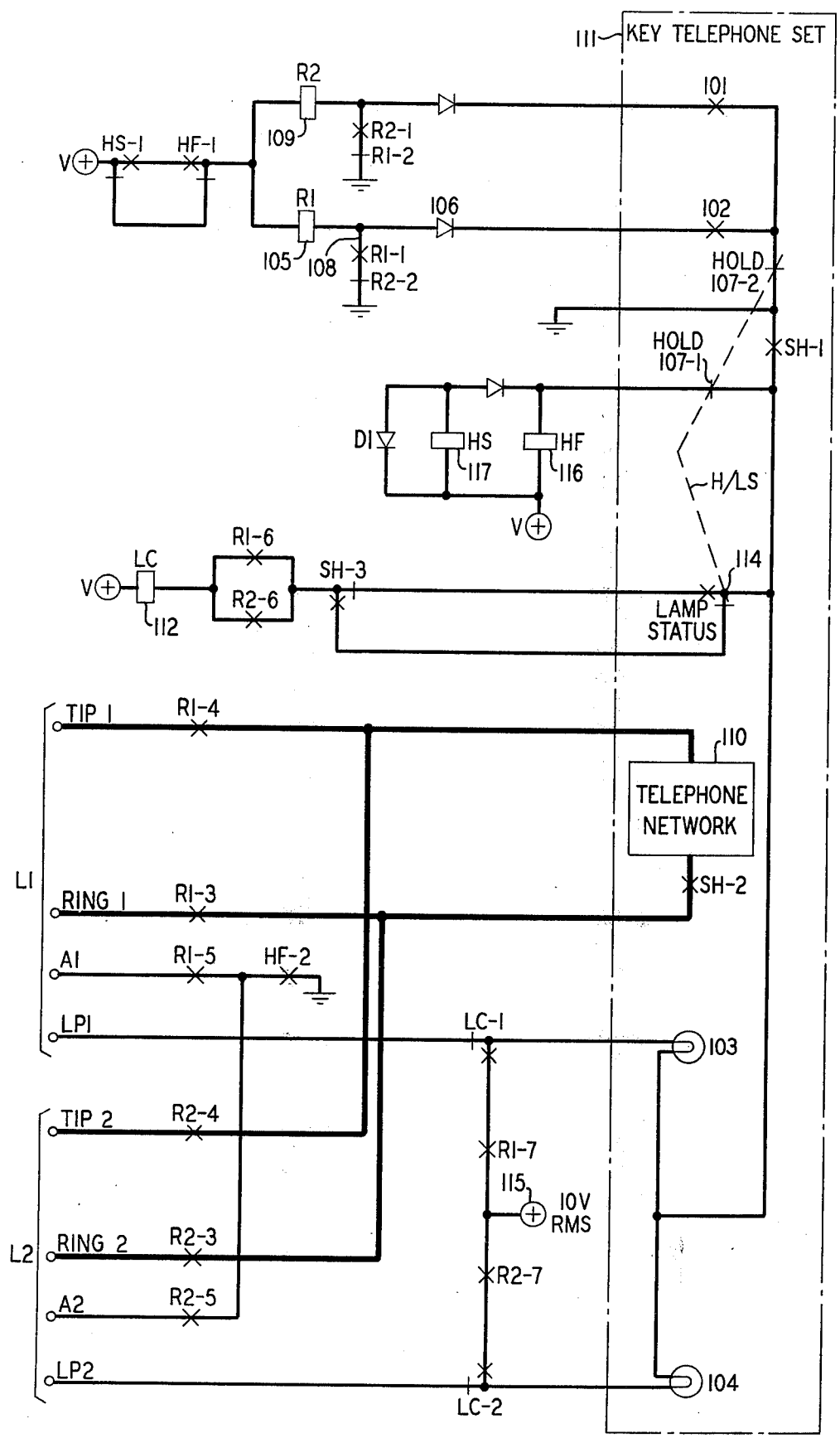

NONLOCKING KEY TELEPHONE SET

BACKGROUND OF THE INVENTION

This invention relates to key telephone systems and, more particularly, to such systems employing or which are capable of employing nonlocking key telephone sets.

Most present-day key telephone systems continue to employ key telephone sets of the locking key variety. The ubiquitous models 565HK (rotary dial) and 2565HK (pushbutton dial) telephone sets manufactured by the Western Electric Company are of this type. These sets include a hold button and a plurality of pickup key buttons for allowing the telephone user to access up to five different central office lines or trunks. When a pickup key is depressed to access a particular line, a mechanical detent mechanism associated with the key button group causes the button to latch in its depressed or operated condition. The station user is thus given a mechanical indication of the line that has been accessed by the set because that line is identified by the drepressed key button. In addition, the pickup key buttons may be equipped with lamps.

More recently, nonlocking key telephone sets have been devised in which the mechanical detent mechanism has been eliminated. Because there is no mechanically latched button to identify the line being accessed by the station set, sets equipped with nonlocking key buttons must be provided with lamps to indicate to the user the status of the lines terminating at the station. An example of a prior art system employing nonlocking key telephone sets is disclosed in H.P. Anderson et al U.S. Pat. No. 3,244,815, issued Apr. 5, 1966.

Most prior art circuits responsible for key lamp illumination, such as those disclosed in R.E. Barbato et al U.S. Pat. No. 3,436,488, issued Apr. 1, 1969, and C.E. Morse et al Pat. No. 3,239,610, issued Mar. 8, 1966, have typically made no distinction in the illumination or interruption rate delivered to the different key telephone sets in a group. For example, if a given key telephone set has acess to four different lines one of which is picked up, one of which is ringing, one of which is on HOLD, and one of which is idle, the key lamp for the first line will be steadily illuminated at all telephone sets having a pickup key for this line, the key lamps for the second line will all be illuminated at the ringing rate, those for the third line will all be illuminatad at the hold rate, and the lamps for the last line will all be dark. One exception to this has been the "I-HOLD" system of lamp illumination disclosed in A.D. Limiero et al U.S. Pat. Re. 26,722, issued Nov. 25, 1969, in which a distinctive lamp illumination was provided at the set placing the line on hold while conventional hold illumination was provided at all other sets capable of accessing the held line.

While the aforementioned systems of uniform key lamp illumination are quite satisfactory for illuminating the key buttons of conventional locking key telephones sets, the great profusion of winking, blinking, and steadily illuminated lamps can be confusing when there is nothing else (e.g., a locked key) to help focus the station user's attention. Further confusion for a user scanning the pickup of a nonlocking set may result from the use of low current, light emitting diodes to illuminate the nonlocking keys since these devices do not presently provide as bright or as extensive illumination as the conventional incandescent bulbs.

It is therefore an object of the present invention to provide clear and easily distinguishable line status information in nonlocking key telephone sets under a variety of lamp interruption rates and ambient lighting conditions in which the set may be employed.

Alternate schemes for more clearly displaying line status information provide for the use of more than one lamp per key. However, the additional lamps and related control circuitry are expensive and complex.

It is an object of the present invention, therefore, to provide complete line status information in nonlocking key telephone sets inexpensively and simply.

SUMMARY OF THE INVENTION

The present invention includes circuitry in the key telephone unit and key telephone set for displaying full line status information at a nonlocking key telephone station when the station is on-hook and for normally illuminating only the line acutally in use at the station when the set is off-hook. In addition, circuitry is provided for displaying full line status information when off-hook in response to the depression of a particular key on the telephone key set.

It is therefore a feature of the present invention that the lamps on a nonlocking key telephone set are arranged to give full line status information when the set is on-hook and normally to identify only the line in use at the set when the set is off-hook.

It is a further feature of the present invention that the line status function of the lamps is reversed when a selected button, such as the hold button, is depressed, whereupon full line status information is displayed at the command of the station user.

DESCRIPTION OF THE DRAWING

The foregoing and other objects and features of our invention will become more apparent from the ensuing description when read together with the drawing, the single FIGURE of which shows a simplified control arrangement for providing distinctive lamp illumination to nonlocking key telephone pickup keys.

DETAILED DESCRIPTION

For ease of discussion, the arrangement is shown with but two nonlocking pickup keys, 101 and 102, for accessing two lines, L1 and L2, respectively. Each of the keys has associated with it a respective lamp 103, 104.

The circuit operates in the following way. Let it be assumed that the telephone set is on-hook, that keys 101 and 102, the HOLD button 107 and the switchhook SH are normal. All relays in the drawing are released. Illumination power for lamps 103 and 104 is supplied from a conventional interruption rate source (not shown) over lamp power leads LP1 and LP2 and continued over back contacts LC-1 and LC-2 to the respective lamp filaments. Even though it has been assumed that pickup keys 101 and 102 and the switchook are normal, lamps 103 and 104 may nevertheless be illuminated because lines L1 and L2 may be in use by another key telephone set (not shown) having pickup key access to these lines.

Let it now be assumed tht the set is placed in the off-hook condition. Prior to the operation of either key button 101 or 102 ground is provided over the operated switchhook make contact SH-1 and the normally released back contact 107-1 of the HOLD button to operate relays HF and HS. Relay HF has a conventional operating winding 116 while the winding 117 of relay HS is made slow release by means of shunting diode D1.

With relays HF and HS operated, let it be assumed that nonlocking pickup key 102 is momentarily operated. A path is completed from battery over the operated make contacts of transfer contacts HS-1 and HF-1, the winding 105 of relay R1, diode 106, the operated make contact of pickup key 102 and the back contact 107-2 of the HOLD button to ground. Relay R1 operates in this circuit. When nonlocking pickup key 102 is released, the operating path to ground for winding 105 of relay R1 is removed by relay R1 remains operated, being locked to ground via lead 108, its operated make contact R1-1 and back contacts R2-2. In addition, as is apparent, operated back contact R1-2 prevents relay R2 from locking should key 101 be inadvertently depressed at this time.

The operation of relay R1 at its make contacts R1-3, R1-4 connects the tip and ring leads of line L1 to telephone network 110 and the station user is placed in communication with the party at the remote end (not shown) of line L1. It should be noted in addition that ground is provided over operated make contact HF-2 and R1-5 to lead A1 of the remote line circuit (not shown) as is well known. Line circuits such as those disclosed in the aforementioned Morse et al or Barbato et al patents normally expect to find ground on the "A" lead when the line is picked up by a key telephone set. With relay R1 operated (recalling that the telephone set is off-hook on line L1) a path is completed from battery, winding 112 of relay LC, make contact R1-6, the make contact of switchhook transfer contacts SH-3, and the back contact of lamp status transfer button contacts 114, to ground. Relay LC operates in this path and, at its transfer contacts LC-1, transfers lamp illumination power for lamp 103 from the remote source (not shown but which is assumed to be connected at the remote end of lead LP1) to local power source 115 in series with operated make contact R1-7. At the same time, relay LC at the back contacts of its transfer contacts LC-2 disconnects lamp 104 from the external lamp illumination source assumed to be connected at the remote end of lead LP2 and transfers lamp 104 to the open circuit provided at the nonoperated make contact R2-7. Lamp 104 remains dark under these circumstances regardless of whatever state line L2 may actually be in as the result of the operation of other telephone sets (not shown) having key button access to this line.

It is thus seen to be an aspect of the operation of our control arrangement normally to remove lamp illumination from the nonselected pick-up keys once the set has been placed in the off-hook condition by the station user's operation of one of the keys. This feature has several advantages: so long as the station user is talking to the remote party on line L1 and is concerned with the content of that conversation, it is wasteful to provide lamp illumination for the other key buttons of the set. When the station user is finished with that conversation, he or she may place the telephone set in the on-hook condition preparatory to placing another call. When the set is placed on-hook, the release of the make contact of switchook transfer contacts SH-3 opens the operating path for relay LC which releases. Relay LC released at the released back contacts of its transfer contacts LC-1, LC-2 reconnects lamps 103, 104 to the external lamp illumination sources (not shown but assumed to be connected at the remote ends of leads LP1, LP2). With the external lamp sources reconnected to lamps 103, 104 the station user is informed as to the status of all of the lines so that he or she may pick an idle line to make an outgoing call or a line associated with a flashing lamp to answer an incoming line.

If instead of terminating the existing conversation on line L1, the station user wishes to place that line on hold, the HOLD button may be depressed thereby to apply the holding condition to the remote line circuit. The operation of the HOLD button at its operated back contact 107-1 opens the operating path for relays HS and HF. Relay HF releases immediately and at its released make contact HF-2 removes ground from lead A1. The remote line circuit (not shown) operating in the conventional manner applies a holding bridge across conductors RING1 and TIP1. With relay HF released and relay HS remaining operated, the operating path for relay R1 is interrupted by transfer contacts HS-1 and HF-1. Relay R1 releases and at its released make contacts R1-3 and R1-4 disconnects telephone network 110 from the tip and ring conductors of line L1. Thereafter relay HS releases. (The release of relay HF before the release for relay R1 is important to ensure that the external line circuit will apply the holding bridge before network 110 is disconnected.)

Advantageously, in accordance with another aspect of our invention, the lamp status transfer button contacts 114 may be ganged by optional linkage H/LS to be operated simultaneously with the HOLD button 107. Thus, when the HOLD button is operated, the back contact of transfer contacts 114 will immediately interrupt the operating circuit for winding 112 of relay LC allowing the relay to release and to restore external lamp power illumination for lamps 103 and 104. Thus, incident to the inititation of the holding condition, the station user may be apprised as to the status of all of the lines to which he or she has pickup key access. The giving of this line status information, in effect at the command of the station user, has the advantage of affirmatively focusing the station user's attention to the lamp illumination display. It is thought that furnishing the information on command will be more effective in having that information correctly understood by the station user.

What is claimed is:

1. A key telephone set having a plurality of illuminatable nonlocking keys for selectively connecting the set to any of a plurality of telephone lines comprising
    means operative when said set is in the on-hook state for completing a path to supply illumination power to said keys in accordance with the respective supervisory state of each of said lines, and
    means operative when one of said keys has been operated and said set is in the off-hook state for disconnecting said illumination power from the remaining ones of said keys.

2. A key telephone set in accordance with claim 1 wherein said means for disconnecting includes means for supplying local power illumination to said one of said keys.

3. A key telephone set in accordance with claim 1 further comprising
    key control means operable when said set is in the off-hook condition for disabling said means for disconnecting and for reconnecting said illumination power to said keys for the illumination thereof in accordance with the respective supervisory states of said lines.

4. A key telephone set in accordance with claim 3 wherein said telephone set includes a HOLD button, and wherein said disabling means includes relay contact means controlled by said HOLD button.

5. In a key telephone system including a telephone set having a plurality of signaling lamps and a plurality of nonlocking keys for selectively connecting telephone lines to a terminating network said system further including at least one set of relay contacts responsive to said nonlocking keys for connecting said telephone lines to said network, a second set of relay contacts, for providing illumination power while in a first state of operation to said lamps for displaying full line status information when said telephone set is on-hook and for providing illumination power while in a second state of operation only to the one of said lamps corresponding to the line in use at said telephone set when said set is off-hook and, means operative to restore said second set of relay contacts to the first state of operation when said set is off-hook for displaying full line status information.

6. Apparatus as in claim 5 wherein said means operative to restore said second set of relay contacts includes one of said nonlocking buttons on said key telephone set and a relay responsive to said one of said nonlocking buttons.

7. Apparatus as in claim 6 wherein said means operative to restore further includes a series connection between a source of potential and ground said series connection comprising the coil for operating said second set of relay contacts, the parallel connection of make contacts which are respectively operated with each of said first set of relay contacts, said coil being connected between said source of potential and said parallel connection of make contacts and parallel connected paths between said parallel connection of make contacts and ground including in the first path, the make contact of the relay responsive to said switchhook and the break contact of said relay responsive to said one of said nonlocking buttons and in the second path, the break contact of the relay responsive to said switchhook and the make contact of said relay responsive to said particular one of said nonlocking buttons.

8. Apparatus as in claim 7 wherein a selected one of said nonlocking keys operates at least one holding relay, and wherein the front contacts of said holding relay selectively interrupt the continuity of a particular set of said lines and ground.

* * * * *